INVENTOR.
Emmett G. Morrison
BY Charles H. Redman
Atty.

INVENTOR.
Emmett G. Morrison
BY: Charles H. Redman
Atty.

3,463,273
VEHICLE BRAKE ASSEMBLY
Emmett G. Morrison, Willow Lake Estates,
Elgin, Ill. 60120
Filed Feb. 29, 1968, Ser. No. 709,330
Int. Cl. F16d 63/00, 65/10
U.S. Cl. 188—70                          7 Claims

ABSTRACT OF THE DISCLOSURE

A vehicle brake assembly comprising a brake disc and caliper pads to co-operate therewith and auxiliary brake shoes for co-operation with a brake drum. All the aforesaid elements are enclosed within a brake housing. The brake disc has cooling air passageways in communication with the exterior of the housing.

---

This invention relates to the novel construction and assembly of disc brakes for automotive vehicles, wherein all braking surfaces and components, including the parking and hand emergency brake components, are enclosed within an air cooled brake drum assembly.

The present disclosure constitutes an improvement over the brake assembly shown and disclosed in my Patent No. 3,318,424, granted May 9, 1967.

More particularly, the brake housing, and specifically the brake disc, is formed with radial passageways extending from the outside surface of the brake disc to the interior thereof where they are joined by a common passageway so as to generate a flow of cooling air during use. The brake housing is closed on all sides so as to protect enclosed parking and emergency brakes and a disc brake from road dirt, water, ice and other foreign matter.

It is, therefore, an object of the invention to provide a brake assembly of the character referred to.

Another object is to provide a closed brake housing having passages for cooling air in its brake disc.

Another object is to provide a disc brake assembly of the character referred to wherein parking and emergency brake components are enclosed in the brake housing.

Another object is to provide means to protect all brake components in a brake assembly from the accumulation of road dirt, ice, snow and other foreign matter thereby to minimize the amount of applied force required to actuate such brake components.

The structure by means of which the above noted and other advantages and objects of the invention are attained will be described in the following specifications, taken in conjunction with the accompanying drawings, showing a preferred illustrative embodiment of the invention, in which.

Figure 1:
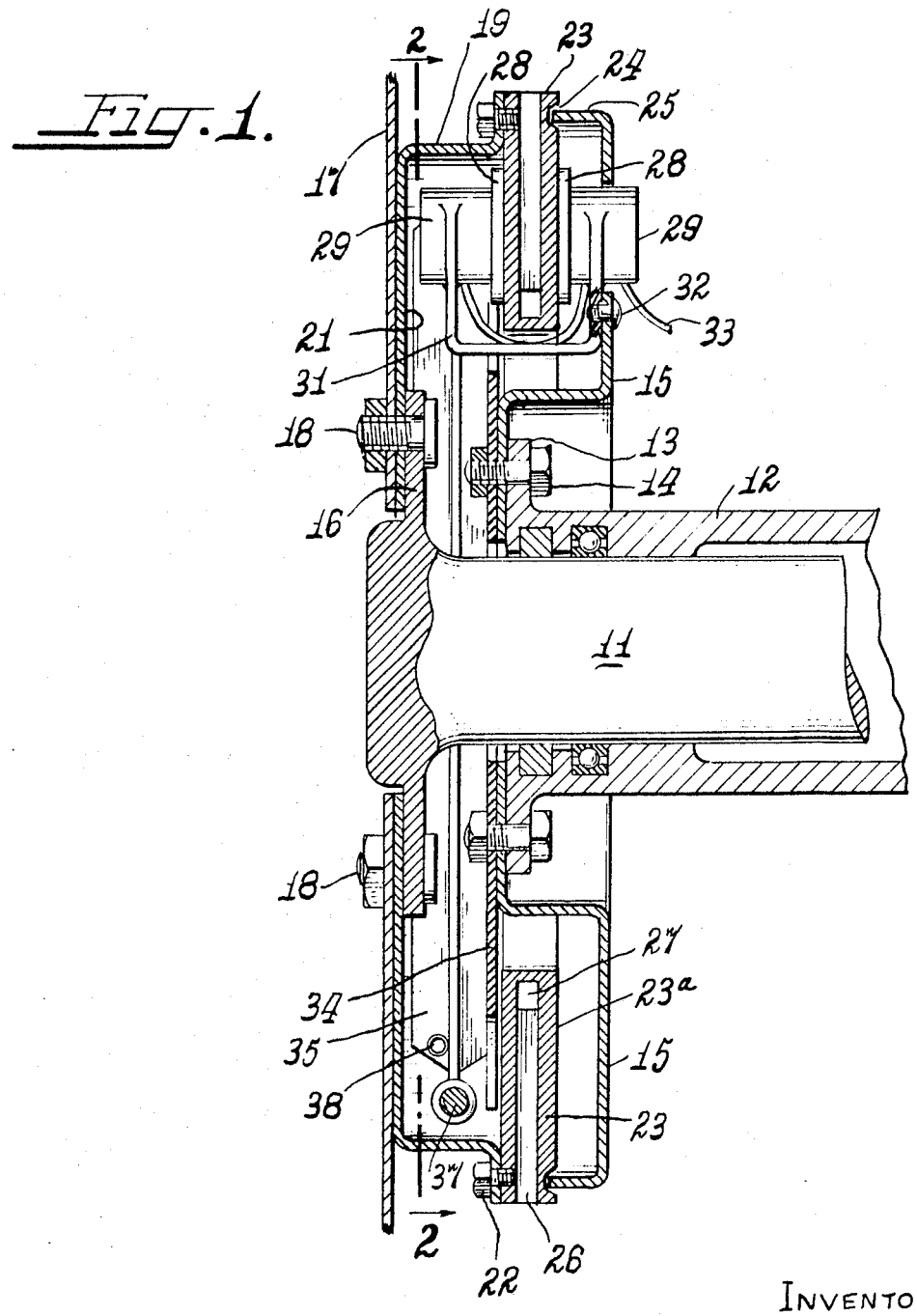
FIG. 1 is a vertical axial sectional view of the brake assembly.
Figure 2:
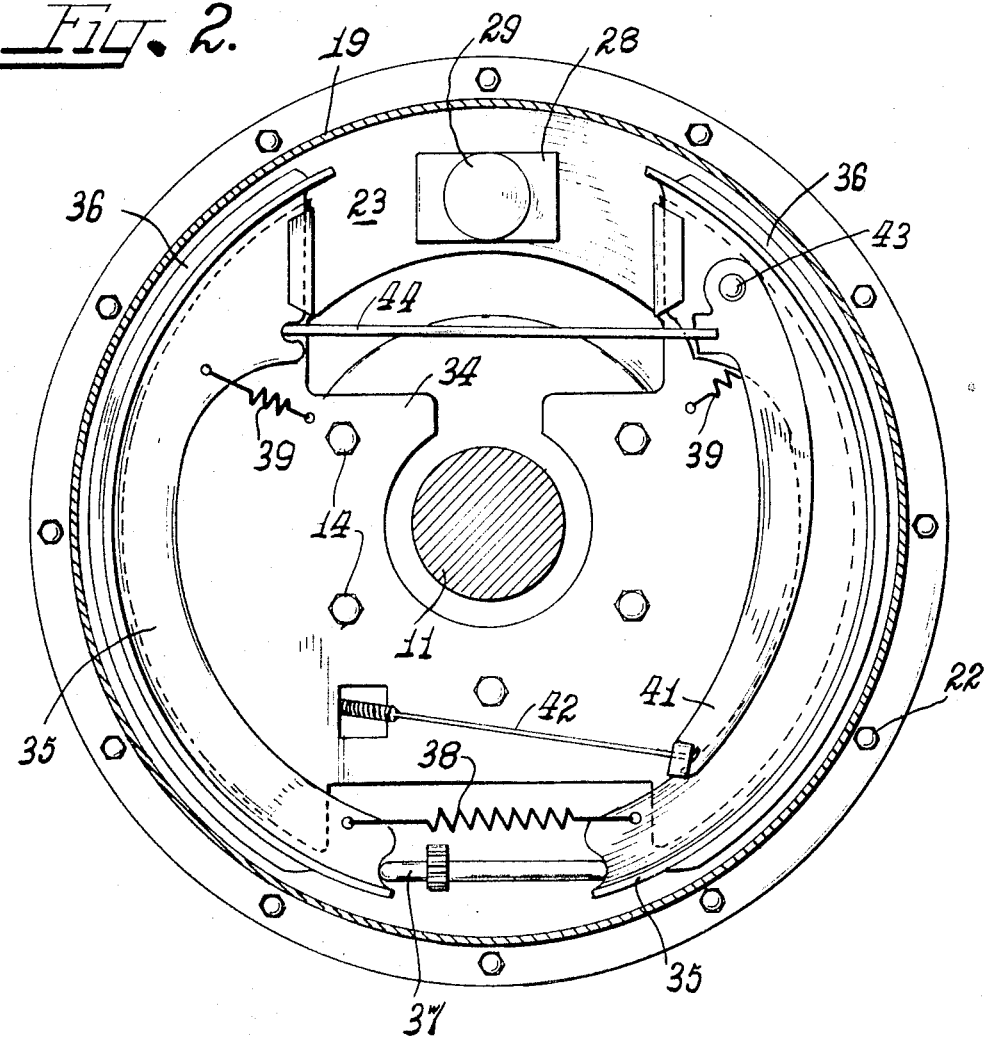
FIG. 2 is a sectional view taken substantially on line 2—2 of FIG. 1.
Figure 3:
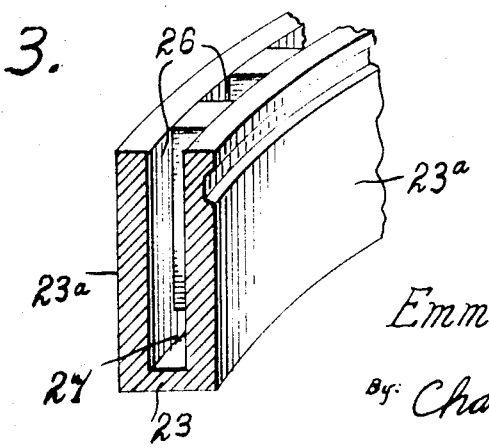
FIG. 3 is a detail sectional perspective view of the brake disc.

Referring to the exemplary disclosure of the invention as shown in the accompanying drawings, the brake assembly is carried on the usual axle 11 and axle housing or casing 12. The axle casing terminates in an external flange 13 to which is secured, as by bolts 14, a back plate 15. The axle projects beyond the end of the casing 12 and has formed integral therewith an external flange 16 to which an automobile wheel 17 may be secured by a peripheral row of stud bolts 18 in the usual manner.

The assembly includes a brake drum 19 having its side wall 21 secured to flange 16, as by said bolts 18. The brake drum 19 has, integral with or otherwise secured to it, as by bolts 22, an internal brake disc 23 which constitutes a part of the brake drum. The free face of brake drum 19, specifically the free face of the attached brake disc 23, preferably is formed with an annular recess 24 into which a perimeter flange 25 on the back plate 15 is nested. Thus, the back plate 15, brake drum 19 and brake disc 23 cooperate to form a closed brake housing within which all of the braking components, to be described, are enclosed.

The brake disc 23 has two opposed braking surfaces 23a and its interior is formed with a peripheral series of radial passageways 26 that open onto the outside surface of the disc. Their inner ends terminate short of the inner disc periphery and they are connected by a circumferential passage 27. These passageways 26–27 function to cause air to circulate within the disc 23 during its rotation to effect rapid cooling of the brake disc 23, auxiliary brakes to be described, and the brake housing during and after the brakes are applied.

Arranged for co-operation with the braking surfaces 23a are a pair of caliper pads 28 one carried on the piston of each of a pair of caliper cylinders 29 which in turn are supported against free rotation in a bracket 31 secured firmly, as by bolts 32, to back plate 15. A hydraulic line 33 leads from said cylinders to the usual master brake cylinder (not shown). In operation, for braking, the caliper pads 28 are thrust against the respective opposed braking surfaces 23a of the brake disc 23 so as to effectively sandwich the brake disc between them. Heat generated during braking is dissipated rapdily through passageways 26–27. The caliper pads 28 may be easily removed, for replacement, upon opening the housing and removal of their conventional holding screws.

Also mounted within the brake housing are emergency and parking brakes. As shown, a shoe plate 34 is secured firmly to the inside surface of the rigid back plate 15, as by the bolts 14. This plate mounts a pair of brake shoes 35, of usual construction, having linings 36 on their arcuate surfaces to coact with the inside surface of brake drum 19. These shoes have arranged between their lower ends an adjusting element 37 against which they are held by a connecting spring 38. Springs 39 retain the shoes normally out of contact with the brake drum. An operating lever 41 affords a mechanical connection through cable 42 with the usual manually actuated control, not shown, arranged within the vehicle. Specifically, the lever 41 is pivotally connected, at 43, to one of the brake shoes 35 and is operably connected to the other brake shoe by a strut rod 44.

Although I have described a preferred embodiment of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. In a vehicle brake assembly, an axle having an external circumferential flange, a circumferential brake drum spaced from and surrounding said axle, a wall connecting said brake drum with the flange to close one face of the brake drum, an internal circumferential brake disc forming a part of said brake drum, a non-rotatable back plate overlying the other face of the brake drum and defining with said wall and brake drum a closed brake housing, brake elements mounted on the back plate within said housing one to cooperate with each face of the brake disc, a brake shoe plate mounted firmly on the inside face of the back plate, and brake shoes mounted on said shoe plate to co-operate with the inside circumferential surface of the brake drum.

2. The brake assembly recited in claim 1, in which the brake disc has a circumferential series of radial air passageways therein opening onto the outer periphery thereof.

3. The brake assembly recited in claim 1, in which the brake disc has internal air passageways in communication with each other and with its outer perimeter.

4. The brake assembly recited in claim 1, in which the brake elements comprise hydraulic cylinders and pads.

5. The brake assembly recited in claim 1, in which the back plate is circular and has a perimeter flange, and the brake disc has a circumferential groove into which said flange is nested.

6. The brake assembly recited in claim 1, in which the brake disc is bolted to the brake drum.

7. The brake assembly recited in claim 1, in which a casing surrounding the axle and the back plate is secured to said casing

References Cited

UNITED STATES PATENTS

| 2,051,474 | 8/1936 | Ford. | |
| 2,701,626 | 2/1955 | Walther. | |
| 3,318,424 | 5/1967 | Morrison | 188—264 |
| 3,379,290 | 4/1968 | Hamilton | 188—70 X |

FOREIGN PATENTS 1,487,116  5/1967  France.

GEORGE A. HALVOSA, Primary Examiner

U.S. Cl. X.R.

188—218